(12) United States Patent
Krone et al.

(10) Patent No.: US 6,425,234 B1
(45) Date of Patent: Jul. 30, 2002

(54) PICK-UP BALER FOR HARVESTED AGRICULTURAL PRODUCE

(75) Inventors: Bernard Krone, Spelle; Otger Weddeling, Harsewinkel; Christian Steglich, Freren; Thomas Wernsmann, Emsdetten, all of (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 0 days.

(21) Appl. No.: 09/719,408
(22) PCT Filed: Jun. 8, 1999
(86) PCT No.: PCT/EP99/03926
§ 371 (c)(1),
(2), (4) Date: Apr. 13, 2001
(87) PCT Pub. No.: WO00/01215
PCT Pub. Date: Jan. 13, 2000

(30) Foreign Application Priority Data

Jul. 1, 1998 (DE) .......................................... 198 29 276

(51) Int. Cl.[7] .............................................. A01F 15/10
(52) U.S. Cl. ...................................................... 56/341
(58) Field of Search ..................... 56/131, 341, DIG. 1, 56/344; 100/88, 100, 142, 189, 218, 255

(56) References Cited

U.S. PATENT DOCUMENTS

| 4,644,862 A | * | 2/1987 | Young .......................... 100/189 |
| 4,928,462 A | * | 5/1990 | Lippens et al. ................ 56/341 |
| 5,467,702 A | * | 11/1995 | Naaktgeboren ............... 100/35 |
| 6,050,074 A | * | 4/2000 | Clostermeyer ................ 56/341 |

* cited by examiner

Primary Examiner—Robert E. Pezzuto
(74) Attorney, Agent, or Firm—Jordan and Hamburg LLP (57) ABSTRACT

A pick-up baler for agricultural produce with a compression piston 9 and a rotary conveyor, which rotates about an axis of rotation 18, comprises rakes 21, 22, which have axes 23 extending approximately parallel to the axis of rotation 18 of the rotor, convey the harvested crop through a supply channel 13, can be swiveled about their rake axes 18 under the control of curves and of which at least one acts as a conveying rake 21, the swiveling of at least one further rake, which functions as a supply rake 22, being controllable as a function of the degree of filling of the supply channel 13 in such a manner that, when a specified degree of filling of the supply channel 13 is reached, the harvested crop, collected there, is conveyed over a baling channel inlet opening 12 into a baling channel 11. The supply rake 22 is guided in a curved path 39, which can be moved from a conveying position into a supplying position, whereas the conveying rakes 21 are guided in an immovable curved path 34.

13 Claims, 9 Drawing Sheets

PICK-UP BALER FOR HARVESTED AGRICULTURAL PRODUCE

BACKGROUND OF THE INVENTION

The invention relates to a pick-up baler for agricultural produce.

In the DE 195 31 240 A1, such a baler is described, for which a rotary conveyor conveys harvested crops, picked up from the ground, through a conveying channel into a baling channel, in which individual rakes, which rotate about a rotor axis of rotation and are disposed, so that they can swivel about their own axes, which are parallel to the rotor axis of rotation, collect the harvested crops initially in the conveying channel and finally, due to a feeding motion of a rake, push it into the baling channel. The swiveling of the rakes, required for the conveying and feeding motions, is realized owing to the fact that the rakes are guided in a pivotable curved path, the degree of swiveling of which is fixed depending on whether the rakes carry out only a conveying motion, or a feeding motion. The swiveling of the curved path can be controlled over a sensor for determining the amount of harvested crops conveyed in such a manner, that the feeding motion is carried out only when a sufficient amount of harvested crops is present in the feeding channel. The quality of the conveying as well as of the feeding depends essentially on the swiveling motions, carried out by the respective rakes, an optimum motion of the rakes in the conveying function differing appreciably from an optimum motion in the feeding function. In the case of the known baler, however, because the swiveling of the rakes for the conveying function as well as the swiveling of the rakes for the feeding function are controlled by the same curved path, this can represent only a compromise between the guiding required for the optimum motion of the rakes for conveying and the optimum motion for feeding.

SUMMARY OF THE INVENTION

The invention is therefore concerned with the problem of indicating a pick-up baler, which can be constructed so as to be adapted better, with respect to its conveying function as well as with respect to its feeding function, to the particular configuration of the baler, especially of the feeding channel and of the transition region to the baling channel, but also to the harvested crops, which are to be baled.

This objective is accomplished by a pick-up baler with the distinguishing features of claim 1.

Owing to the fact that the feeding rakes and the conveying rakes are guided in different curved paths, the latter can be adapted optimally to the main function of the respective rake, the curved path, guiding the conveying rakes, being constructed immovably, and only the curved path, guiding the feeding rakes, having to be constructed movably, so that the feeding rake can be converted from the conveying function to the feeding function.

Further advantages and details arise out of the dependent claims and from an example of the invention, which is described in the following and shown in the accompanying drawings.

DESCRIPTION OF THE PREFERRED EMBODIMENTS

Figure 1:
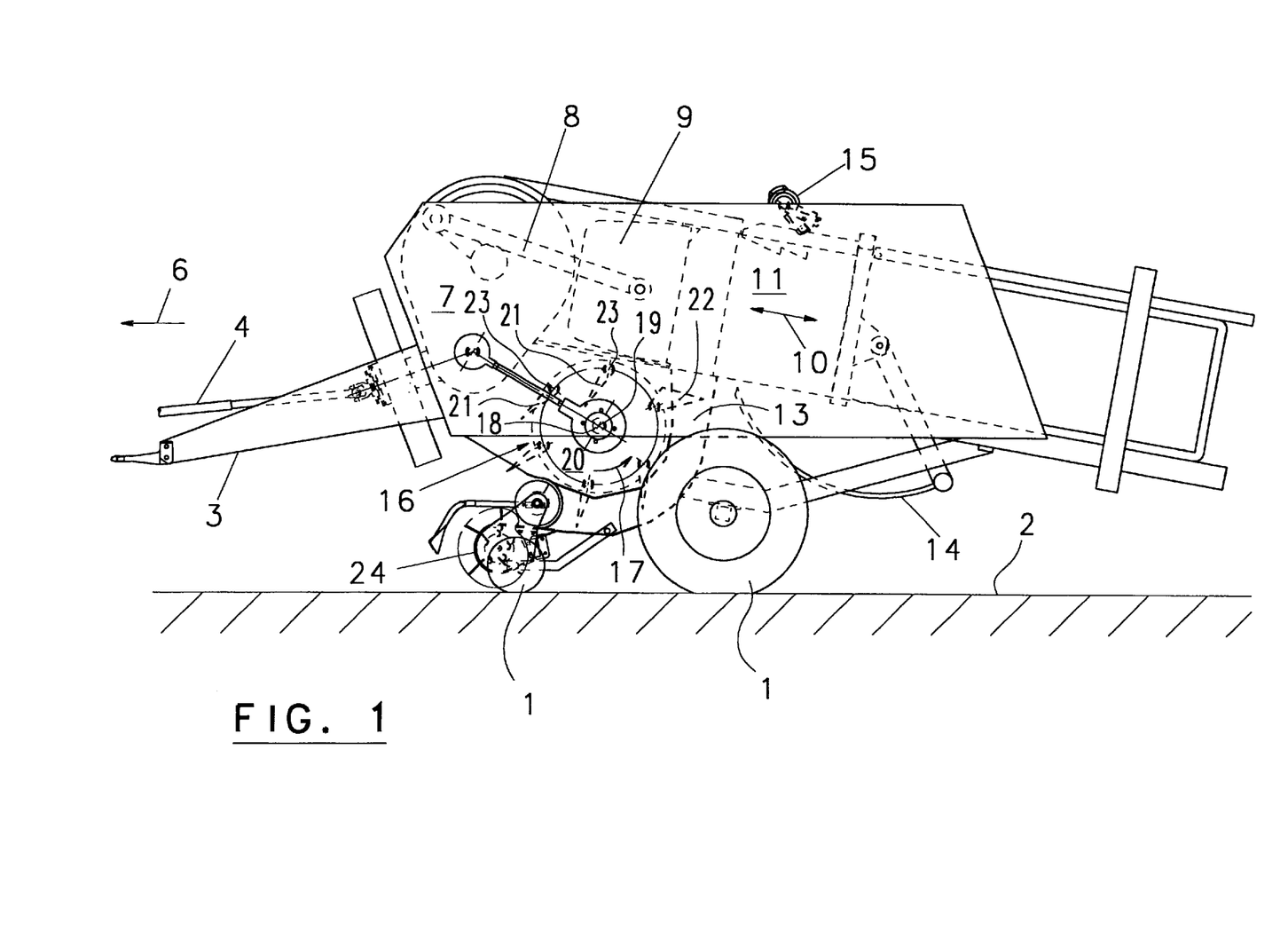
FIG. 1 diagrammatically shows the side view of an inventive pick-up baler.

The pick-up baler, shown in FIG. 1, is supported by wheels on the ground 2 and can be connected over a shaft 3 with an agricultural tractor. The driving direction of the tractor is indicated by an arrow 6. The pick-up piston baler can, however, also be constructed as a self-propelled, automatically driven agricultural vehicle. The embodiment shown is driven by the power take-off of the tractor over an articulated shaft 4. This propulsion is transferred over a main transmission 7 and a crank shaft 8 to a plunger 9, which moves back and forth in the direction of the double arrow 10 in a baling channel 11 and in this way compresses harvested crops, supplied through a baling channel inlet opening 12 to a supplying channel 13, into a bale, around which tying material is then wound by indicated tying needles 14 and the knot-forming device 15.

Moreover, the rotor 16 is rotated by the main transmission 7 in the direction of the arrow 17. The rotor 16 consists of two rotor disks 20, which are connected with a rotor shaft 19 mounted rotatably about a rotor axis of rotation 18 and in which the rakes 21, 22 are mounted so that they can be swiveled about their axes 23. They convey harvested crops, such as straw, hay or incipiently withered green crops, which has/have been picked up from the ground by a device, which is referred to as a pick-up 24.

As shown by FIGS. 2 to 5, the rakes 21, 22 are formed by prongs 26, 27, which are fastened to crossarms 25 and are disposed next to one another at the crossarms 25 over the whole width of the supply channel 13. The supply channel 13 has an essentially continuous external wall 28 and an internal wall, which faces the rotor 16 and is formed by profile plates 29, which are spaced apart. These are disposed in such a manner in the gaps between the prongs 26, 27, that the prongs 26, 27 can reach through the supply channel 13.

In order to be able to direct the swiveling motions of the rakes 21, 22, the crossarms 25 are extended on one side beyond the rotor disks 20 and, at the extended region, have control plates 32, which are connected firmly with the crossarm 25 and are provided with control rollers 30, 31. The rotary conveyor shown has six rakes 21, 22, of which five are constructed strictly as conveying rakes 21 and one functions as supply rake 22.

Figure 2:
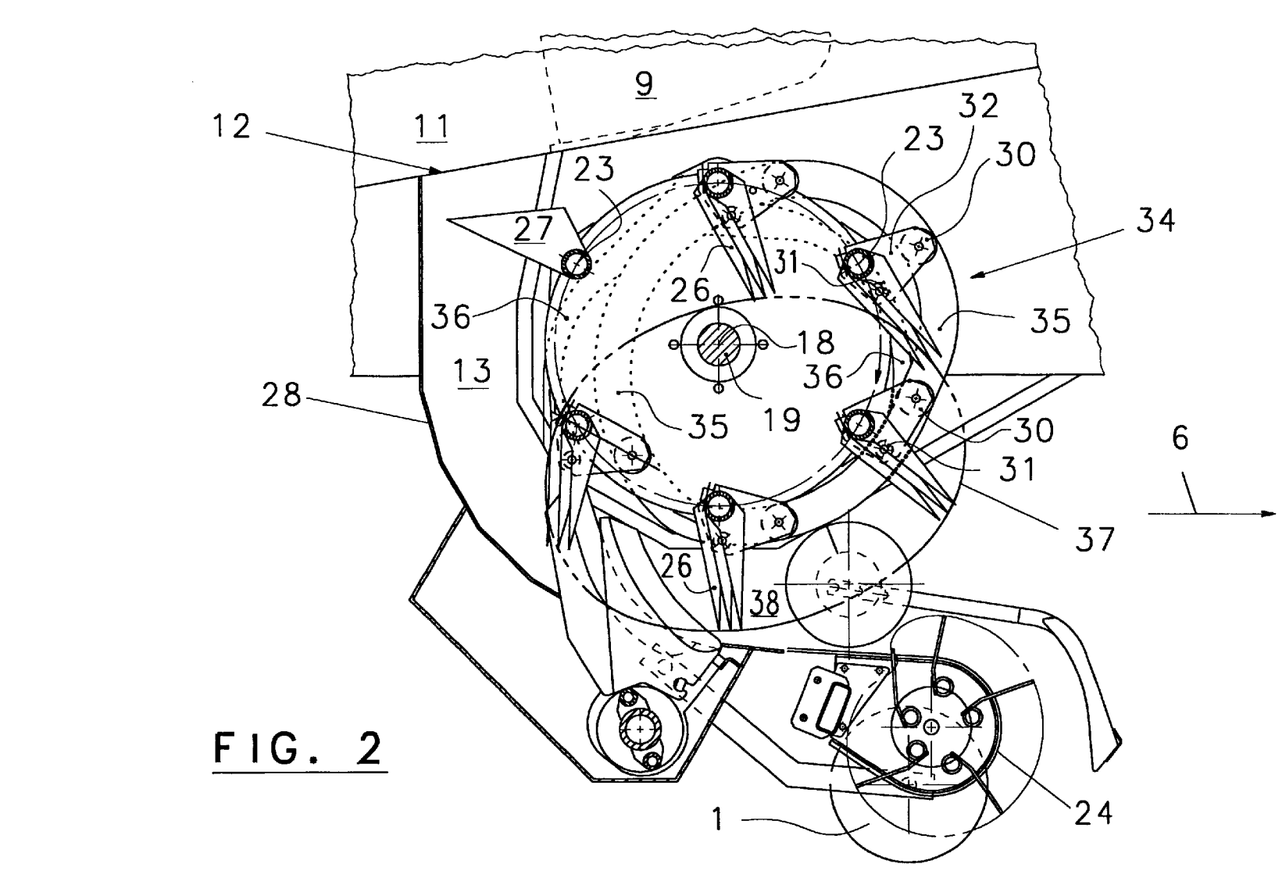
FIG. 2 shows the rotary conveyor of the pick-up baler in section.
Figure 3:
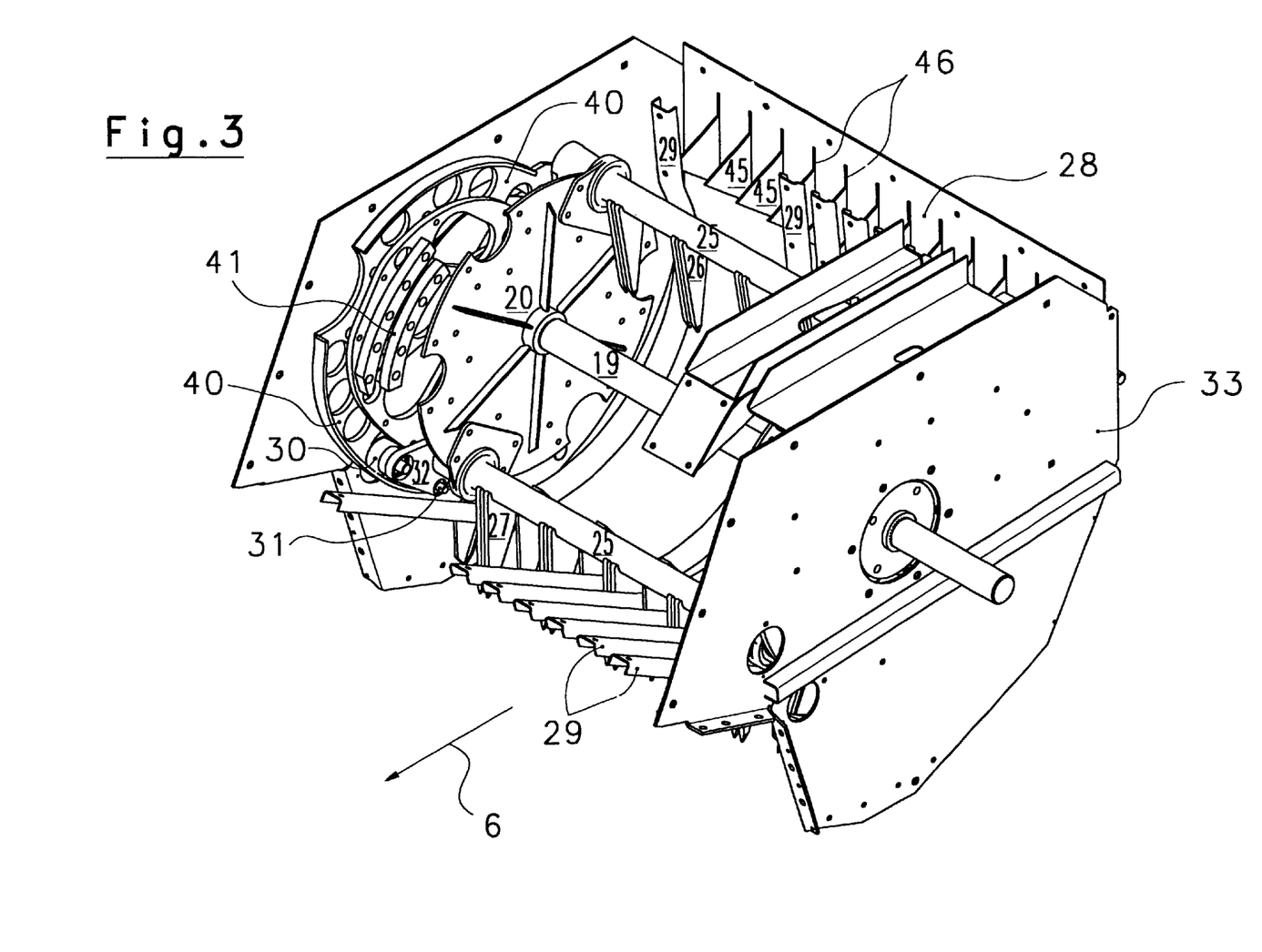
FIG. 3 shows a perspective partial representation of the rotary conveyor.
Figure 4:
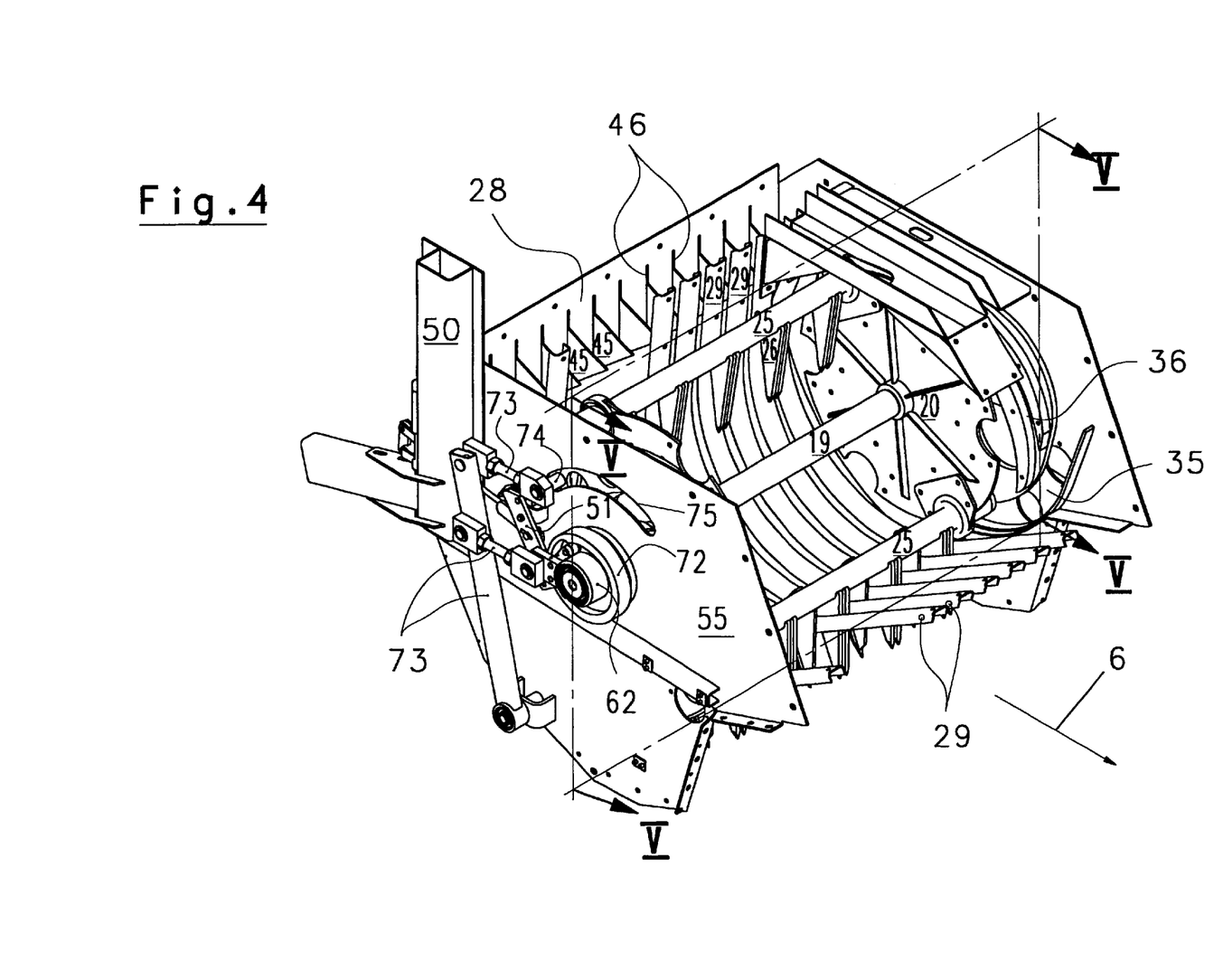
FIG. 4 shows a different view of the object of FIG. 3.
Figure 5:
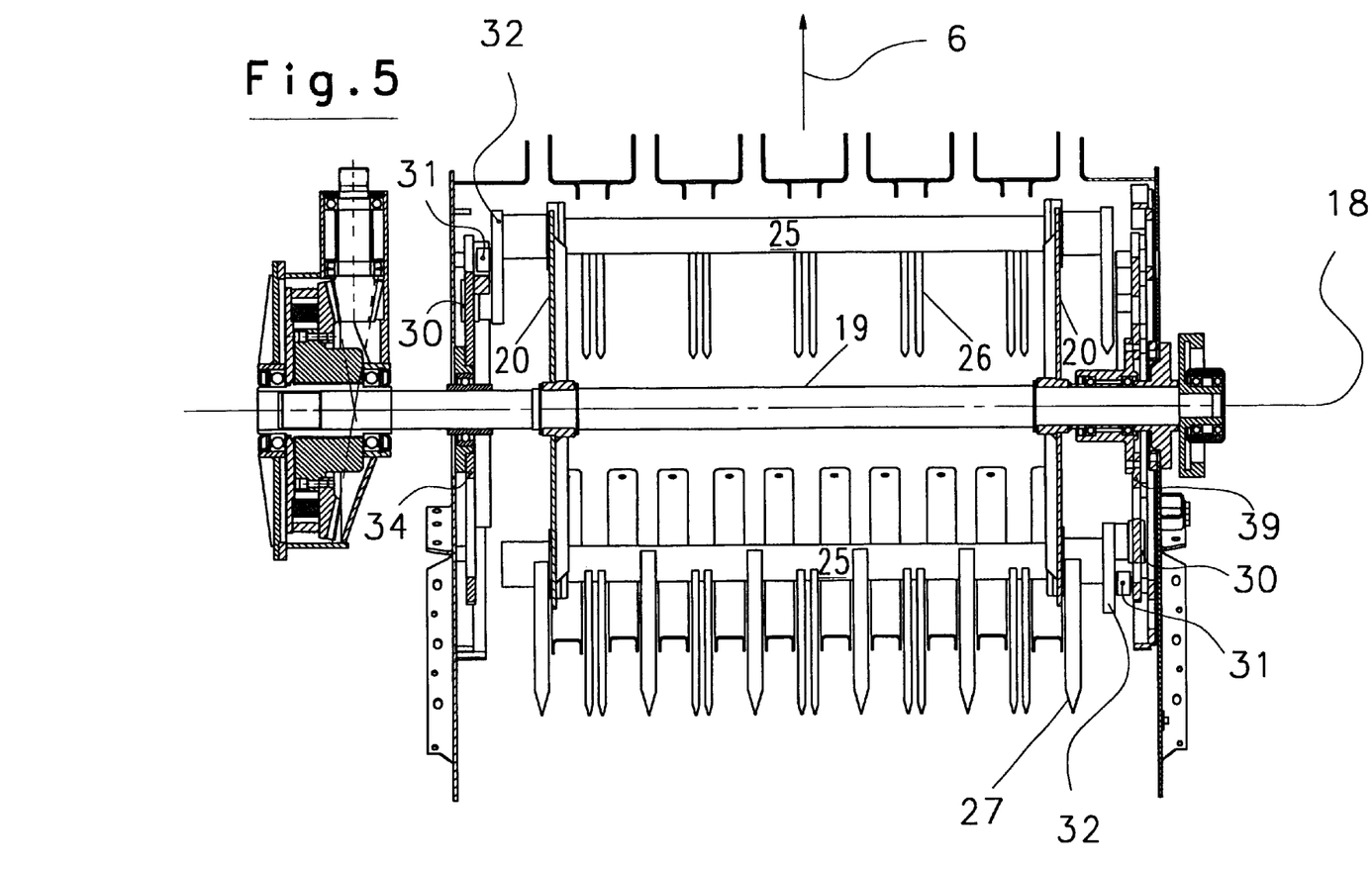
FIG. 5 shows a section along the surface V-V in FIG. 4.

As can be seen particularly in FIGS. 2 and 5, the control rollers 30, 31 of the conveying rakes 21 are guided in the driving direction 6 to the left of the left rotor disks 20 in a curved path 34, firmly connected with the housing 33. In order to achieve a movement of the conveying rakes 21, advantageous for the conveying movement, the curved path 34 is constructed in several parts and has a wide channel 35, in which the larger of the two control rollers 30 is guided, and a narrower channel 36, in which the smaller of the two control rollers 31 takes the over the guiding regionally. In this way, it is achieved that the tips of the prongs 26 of the conveying rakes 21 describe the envelope curve 37, shown in FIG. 2, during a rotation of the rotor 16. This conveying motion is particularly advantageous, since it conveys the Harvested crops, transferred from the pick-up 24, rapidly from the inlet region 38 of the supply channel 13 without bringing about any excessive consolidation of the harvested crops during the further passage of the harvested crops through the supply channel 13.

On the other hand, the crossarm 25 of the supply rake 22 is extended to the other, in the driving direction 6 left side through the left rotor disks 20 and likewise is equipped with a control plate 32 and control rollers 30, 31. These control rollers 30, 31 run in a curved path 39, which is also constructed in several parts and also, like the immovable curved path 34, has a wide channel 40 for the large control roller 30 and a narrow channel 41 for the smaller control roller 31. However, in contrast to the fixed curved path 34, the curved path 39 is movable in that it can be mounted so that it can swivel about the rotor axis of rotation 18.

In the not-swiveled state of the curved path 39, the latter is in the conveying position and guides the supply rake 22 in such a manner, that the prongs 27 of this rake carry out a conveying motion similar to that of the prongs 26 of the conveying rake 21. In FIGS. 8a to 8f, the course of the movement of the prongs 27 of the supply rake 22 in the conveying position during a rotation of the rotor 16 is shown in movement stages of 60° in the clockwise direction. The envelope curve 42, described by the tips of the prongs 27, is also drawn in these Figures. It differs identifiably from the envelope curve 37 of the movement of the prongs 26 of the conveying rakes 21, since the movable curved path 39 is designed optimally for the supply position and not for the conveying position.

The movement of the prongs 27 of the supply rake 22 into the supply position with the swiveled curved path 39 is shown in FIGS. 9a to 9f, in which the reference number 43 refers to the envelope curve of the tips of the prongs in the supply position.

Figure 6:
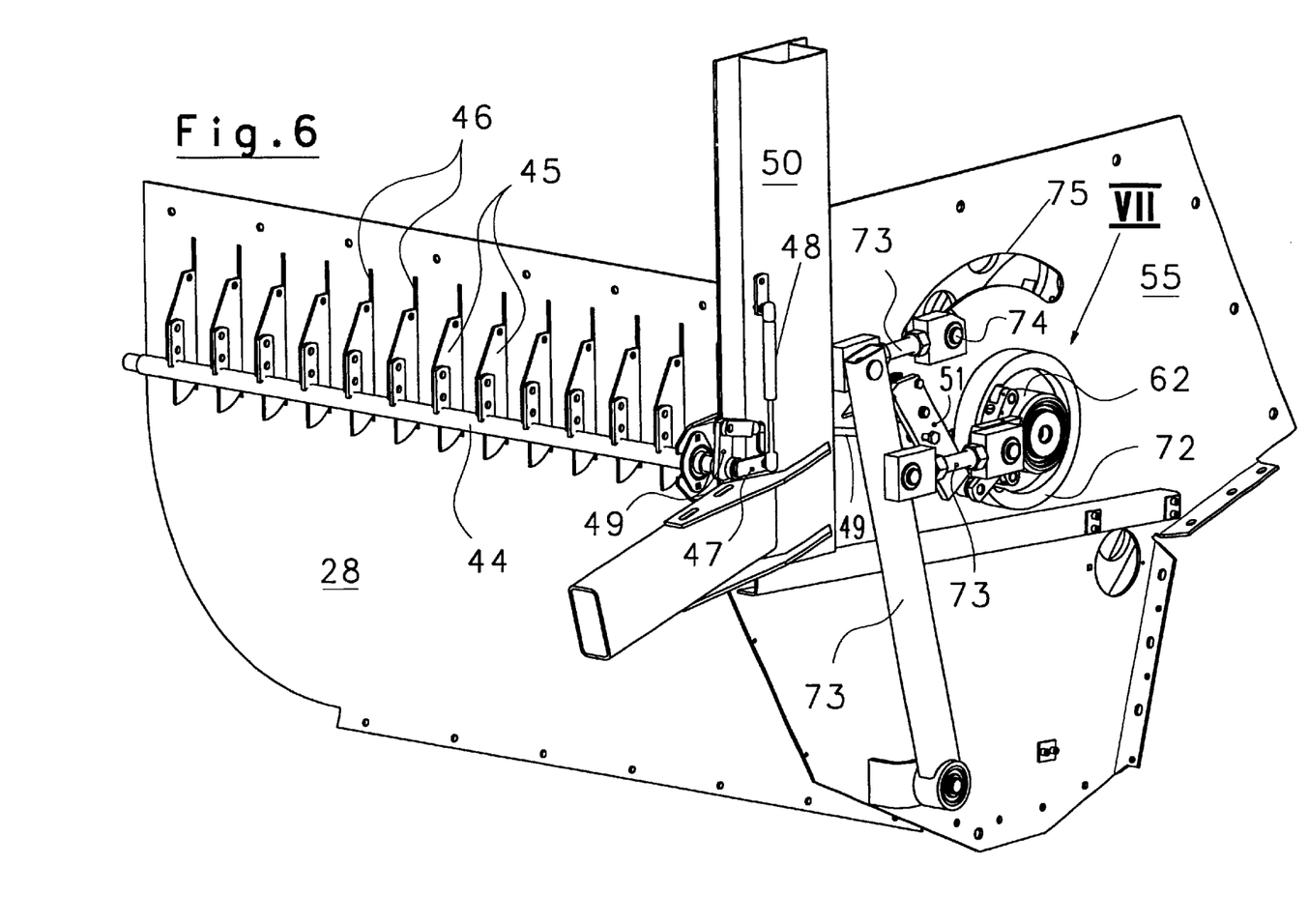
FIG. 6 shows a rear view of the supply channel with the rotary conveyor of the pick-up baler.

The swiveling of the curved path 39 as a function of the degree of filling of the supply channel 13 is controlled by the pressure sensor device, described in the following. For this purpose, a retainer is present, which is disposed below the baling channel inlet opening and has a retaining shaft 44, which extends, in the driving direction behind the supply channel 13 and to which retaining plates 45 are fastened, which reach the supply channel 13 through slots 46 introduced into the outer wall 28 of the supply channel 13 (see FIGS. 3, 4 and particularly 6). The retaining shaft 44 is mounted so that it can be rotated and, over a lever arm 47 fastened to the retaining shaft 44, connected with a spring 48, the force of which holds the retaining plates 45 in the position in which they reach through the supply channel 13. When the supply channel 13 is filled to such an extent with harvested crops by the conveying motion of the rakes 21, 22 that the pressure, exerted on the retaining plates 45 by the harvested crops exceeds the force of the spring 48, the retaining shaft 44 rotates and the retaining plates 45 swivel out of the supply channel 13 and open up the baling channel inlet opening 12. At the same time, the comb-like configuration of the retainer with a plurality of retaining plates 45 is advantageous, since these exert a distributed retaining force on the harvested crops and, combing through the latter, equalize it so that approximately the same amount of harvested crops is supplied over the whole width of the supply channel 13 to the baling channel 13. The amount of harvested crops, supplied to the baling channel 11 during each supplying motion, can be affected by the selection of the force of the spring 48, which may also be adjustable.

For the embodiment shown, the retaining movement of the retaining plates 45 is brought about only by the pressure on the harvested crops. It is, however, also possible, in the case of a retraction movement initiated by the pressure of the harvested crops, to support or actively carry out completely the complete retraction of the retainer from the supply channel 13 by a driving mechanism, which may be of advantage in the case of sensitive harvested crops.

Aside from the lever arm 47, a switching linkage 49 is connected with the retaining shaft 44. It extends through a frame stretcher 50 of the pick-up baler and is connected with an anvil latch 51, in that a bolt 52 of the switching linkage 49 is guided in an elongated hole 53 of the anvil latch 51. The elongated hole 53 fulfills a buffer function, so that small movements of the switching linkage 49 are not transferred directly to the anvil latch 51. This can be seen particularly in FIG. 7. In the case of a larger movement of the switching linkage 49, as caused by pulling the retaining plates 45 out of the supply channel 13, the tension linkage 49 leads to a swiveling of the anvil latch 51 about a bearing bolt 54, which is connected with the rigid side wall 55 of the rotary conveyor. The anvil latch 51 swivels in the direction of the arrow 58 against the force of a tension spring 56, which is also connected with the side wall 55 over a stop 57 and, by these means, releases a roller 59 of a pawl 60, which is supported at the anvil latch 51.

The pawl 60 is part of a rotating joint 61, which belongs to a synchronizing device. The latter ensures synchronization of the movement of the movable curved path 39 and, with that, of the supplying motion of the supply rake 22, with the movement of the compression piston 9. The supplying motion can therefore take place only if the compression piston 9 releases the baling channel inlet opening 12.

For this purpose, in the case of the embodiment shown, the rotor 16 is driven by the main transmission 7 at the same rpm. The synchronization device ensures that the swiveling of the movable curved path 39 and, with that, the supply motion of the supply rake 22 is initiated only at a specified angle of rotation of the rotor 16. For this purpose, the rotating joint 61 has a coupling element, which is constructed as a coupling cage 72, is connected firmly with the rotor shaft 19 and is rotated constantly with the latter. A coupling element embraces a clutch hub 62, the pawl 60 and a further coupling latch 64. The pawl 60 is mounted on the clutch hub 62, which is stationary in the uncoupled state and, due to being supported with the roller 59 on the anvil latch 51, is held outside of a coupling engagement 71 of the coupling cage 72. Over coupling catches 67, 68, the second coupling latch 64 is also held outside of the coupling engagement 71 of the coupling cage 72.

If the anvil latch 51 releases the roller 59 of the pawl 60, the latter is swiveled by a spring 66, which is supported at a pin 65 in the pawl 60 against the clutch hub 62, about a swivel pin 69 in the direction of the coupling cage 72 and, with a roller 70, then latches in the coupling engagement 71 of the coupling cage 72 when the latter, during its rotation, has reached the angle of rotation assigned to the pawl 60. Only when the pawl 60 is swiveled into the coupling engagement 71 of the coupling cage 72, is the coupling latch 64, with its roller 70 also swiveled over the coupling catches 67, 68 into the coupling engagement 71 of the coupling cage 72. Accordingly, a rotational coupling between the coupling cage 72 and the clutch hub 62 is achieved, the pawl 60 causing the clutch hub 62 to be carried along with the coupling cage 72 and the coupling latch 64 preventing the clutch hub 62 from leading the coupling cage 72. If the clutch hub 62 and the coupling cage 72 are connected in this manner, the rotating joint 61 is in the coupled state and the clutch hub 62 rotates with the coupling cage 72. This course of motion is shown in FIGS. 9a to 9f.

Figure 7:
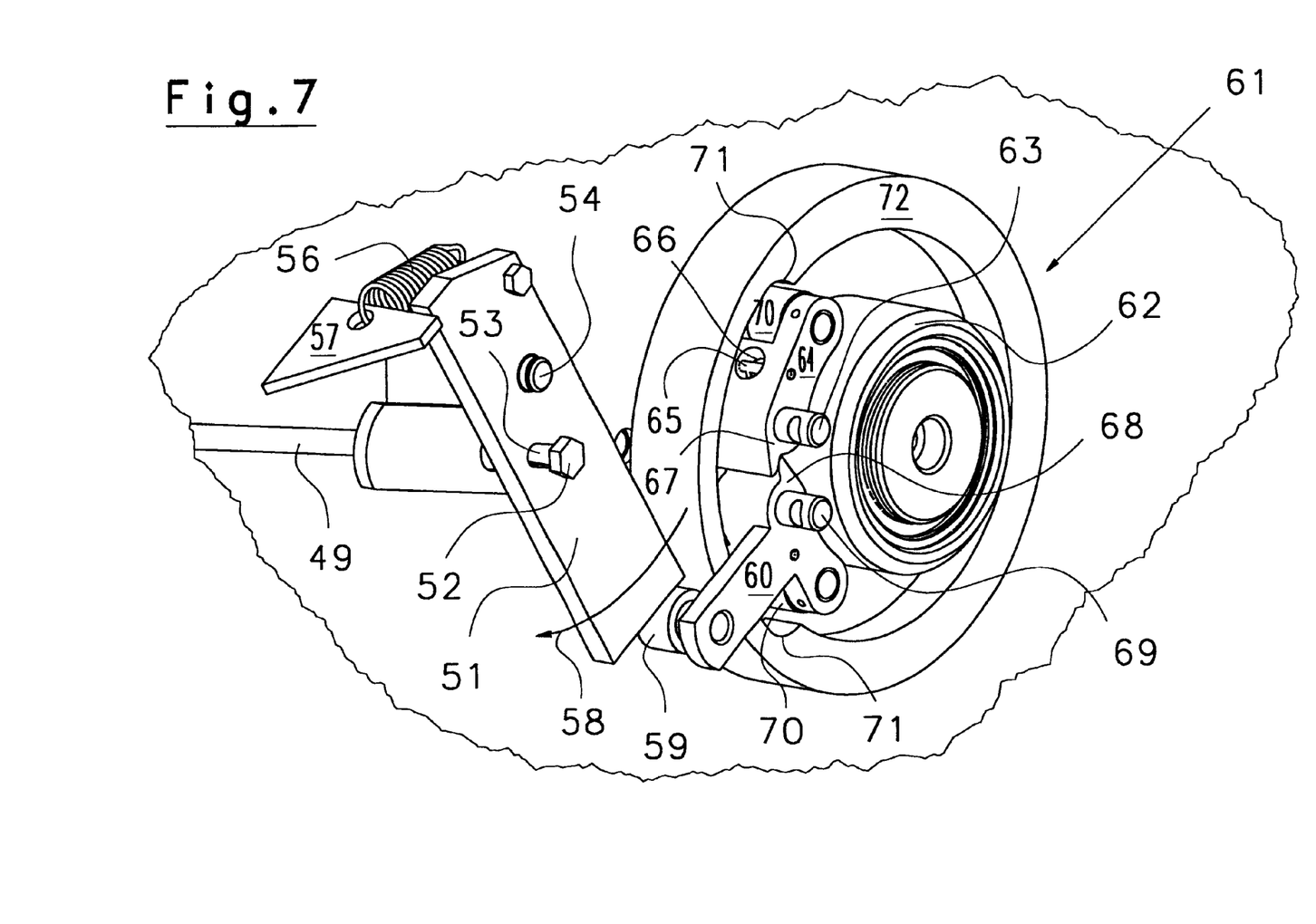
FIG. 7 shows an enlarged representation of the section VII in FIG. 6, FIGS. 8a to f show the course of movement of the supply rake in the conveying position.
Figure 8A:
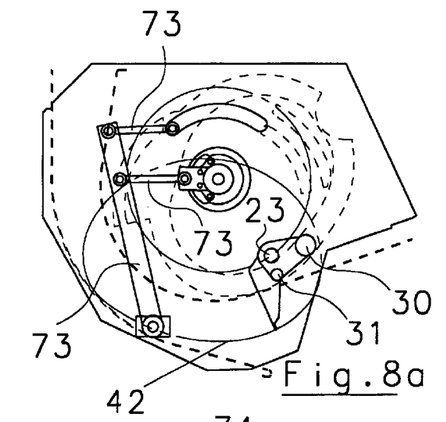
Figure 8B:
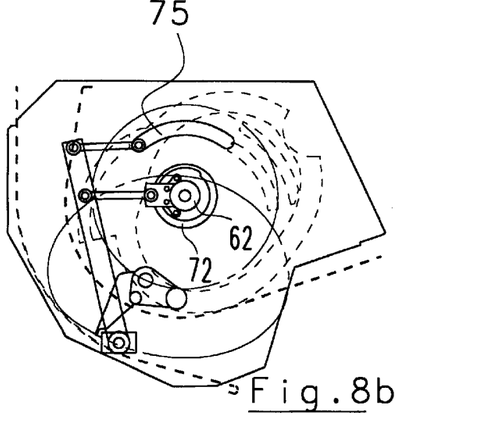
Figure 8C:
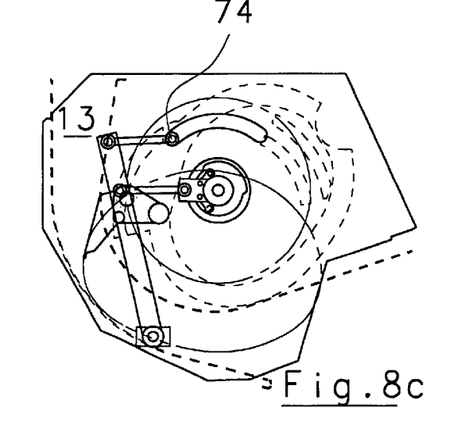
Figure 8D:
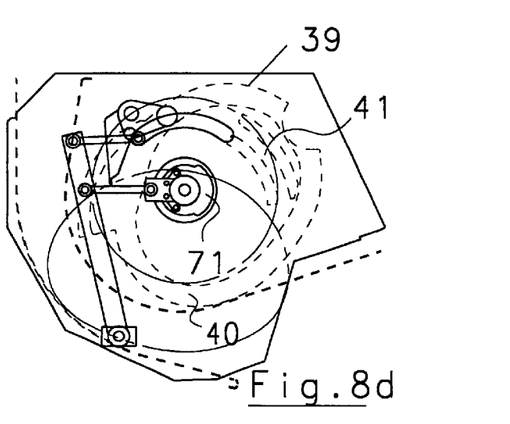
Figure 8E:
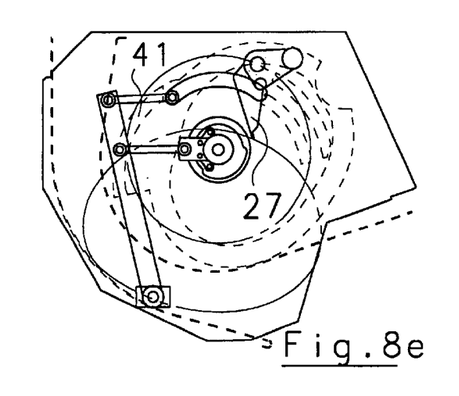
Figure 8F:
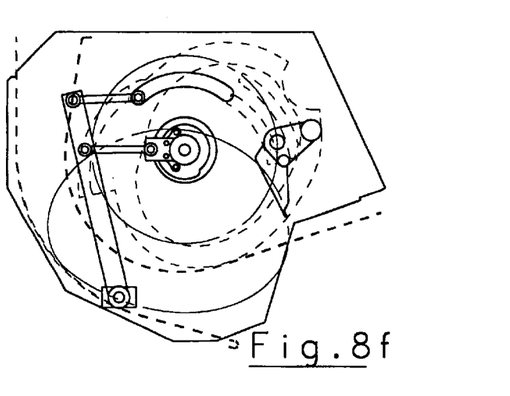
Figure 9A:
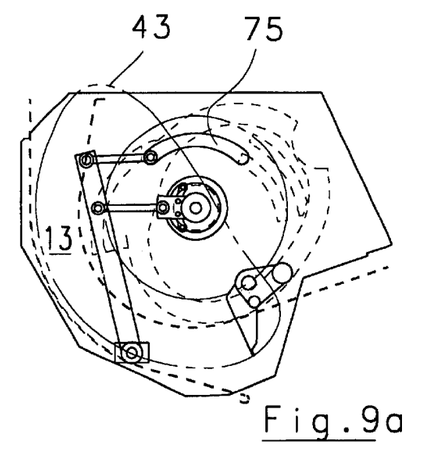
FIGS. 9a to f show the course of movement of the supply rake in the supplying position.
Figure 9B:
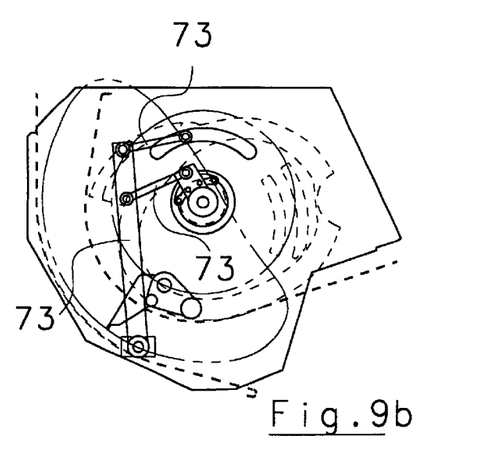
Figure 9C:
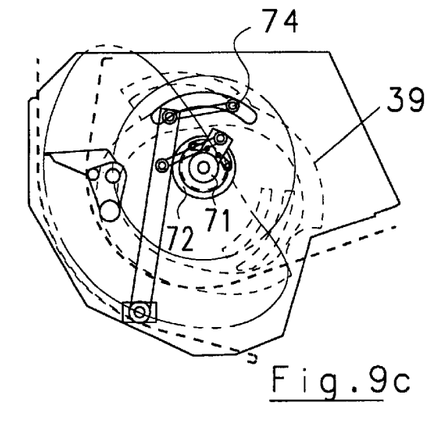
Figure 9D:
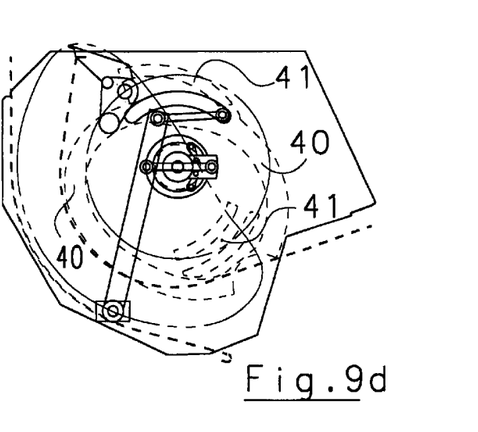
Figure 9E:
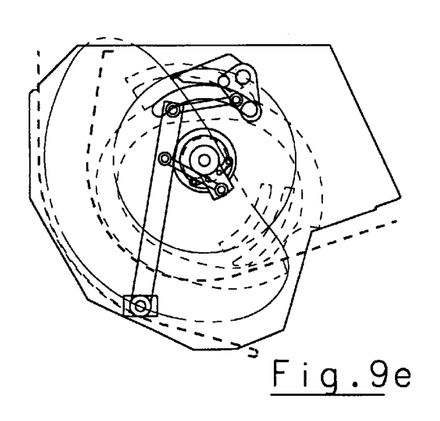
Figure 9F:
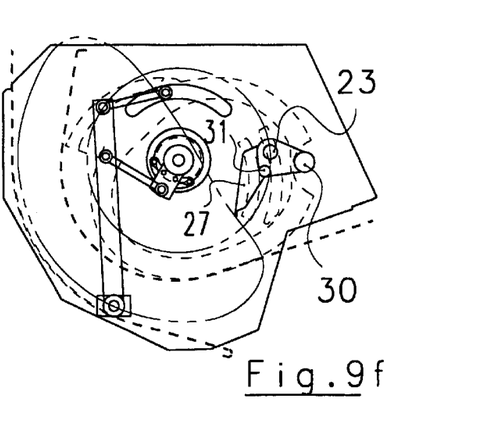

The clutch hub 62 is connected with a curved path movement device, which is not shown in FIG. 7 for reasons of clarity. As shown particularly in FIG. 6 but also in FIGS. 8 and 9, the curved path movement device has a rocker arm arrangement 73, which converts a rotation of the clutch hub 62 over a coupling bolt 74 into a swiveling of the movable curved path 39 about the rotor axis 18. The magnitude of the swiveling angle of the curved path 39 and the course of the velocity of the swiveling motion are fixed by the frame sizes of the rocker arm arrangement 73. The coupling bolt 74 connects the movable curved path 39 with the rocker arm arrangements 73, in that it reaches through a recess 75 in the wall 55 of the housing.

The inventive pick-up the baler furthermore may have a display device, which is not shown and which indicates whether the rotating joint 61 is in the coupled or uncoupled state. By these means, the person operating the pick-up baler receives information concerning the rate of the utilization of the baler. If the coupling cage 72 of the rotating joint 61 is rotating constantly in the coupled state, then a supplying motion is carried out by the supply rakes 22 during each rotation of the rotor 16 and the baler is utilized well. On the other hand, if the rotating joint stops from time to time, that is, if it is uncoupled doing some rotations, the amount of harvested crops taken up by the pick-up 24 is not sufficient so that a supply motion can take place during each revolution of the rotor 16.

Inventive pick-up balers can also be designed so that the rotor 16 rotates at a whole number multiple of the movement frequency of the compression piston 12. The number of conveying rakes 21 can be reduced by these means. However, in the case of such balers, it is necessary to provide the synchronization device with an additional control, which makes coupling possible only at a specified position of the compression piston 9. On the other hand, the rotor 16 can also rotate at a fraction of the frequency of the compression piston 9, such as ½, ⅓, ¼ etc. It must then have a correspondingly larger number of supply rakes 22 and an appropriate number of coupling engagements 71 in the coupling cage 72 or counter elements. As a result of the slower motion of the rotor 16, which is possible therewith, the forces, acting on the rakes 21, 22 and the wear on the rotary conveyor, can be reduced as a whole.

What is claimed is:

1. A pick-up baler for harvested crops, comprising:
   a supply channel;
   a baling channel including a baling channel inlet opening communicative with said supply channel;
   a compression piston disposed in said baling channel, operation of said compression piston compressing said harvested crops conveyed into said baling channel through said baling channel inlet opening via said supply channel;
   a rotary conveyor which rotates about an axis of rotation;
   rakes, including at least one conveying rake and at least one supply rake, rotatably mounted to said rotary conveyer for rotation each about a corresponding rake axis, each said axis extending codirectionally with the axis of rotation of the rotary conveyer;
   said at least one conveying rake being guided along a fixed curved path as said rotary conveyer is rotated, at least a portion of said rake extending into said supply channel such that rotation of said at least one conveying rake about said fixed curve conveys said harvested crops into said supply channel; and
   said at least one supply rake being guided in a movable curved path, movement of said curved path swiveling said at least one supply rake about said rake axis corresponding thereto causing said at least one conveying rake to be reoriented from a conveying position into a supplying position, the swiveling of said at least one supply rake being controllable as a function of a degree of filling of the supply channel in such a manner that, when a specified degree of filling of the supply channel is reached, the harvested crop, collected in said supply channel by operation of said at least one conveying rake, is conveyed via said baling channel inlet opening into said baling channel.

2. A pick-up baler according to claim 1, further comprising a pressure-sensing device for determining a degree of filling of the supply channel.

3. A pick-up baler according to claim 2, wherein the pressure sensing device includes a comb-shaped retainer which extends at least partially through the supply channel.

4. A pick-up baler according to claim 2, wherein the pressure sensing device includes:
   at least one retainer which extends at least partially through the supply channel in a region proximate of the baling channel inlet opening, said at least one retainer being retractable from the supply channel; and
   an abutment element to which said retainer is connected in such a manner that a retraction motion of the retainer from the supply channel is initiated only when a specified degree of filling of the supply channel is reached.

5. A pick-up baler according to claim 4, wherein the retainer includes:
   holding plates; and
   a common holding shaft to which said holding plates are pivotably connected, the abutment being formed by at least one spring which is connected with the holding shaft and counteracts a rotation of the holding shaft.

6. A pick-up baler according to claim 1, further comprising a synchronization device which synchronizes the movement of the movable curved path with movement of the compression piston, such that the at least one supply rake conveys the harvested crop, collected in said supply channel into the baling channel when the compression piston is in a retracted position in which said compression piston releases the baling channel inlet opening.

7. A pick-up baler according to claim 6, further comprising a curved path movement device for imparting the movement to the movable curved path.

8. A pick-up baler according to claim 7, wherein:
   the rotary conveyor includes a rotor which is operationally coupled with the compression piston such that, for each stroke of the piston, one of at least a fraction of a whole revolution, a whole revolution and whole number multiple revolutions is carried out; and
   the synchronization device includes a rotating joint for connecting the rotor with said curved path movement device, a first coupling element connected non-rotationally with the rotor and a second coupling element connected with the movable curved path, said first and second coupling elements being formed such that coupling after disengagement of the rotating joint takes place only at a specified angle of rotation of the rotor.

9. A pick-up baler according to claim 8, further comprising a pressure-sensing device for determining a degree of filling of the supply channel, said pressure sensing device including a control device operable to disengage the rotating joint.

10. A pick-up baler according to claim 7, wherein:
the synchronization device includes a rotating joint for connecting the rotor with said curved path movement device; and
the curved path movement device includes a rocker arm arrangement which converts movement of the rotating joint into the movement of the movable curved path.

11. A pick-up baler according to claim 8, further comprising a display device connected with the rotating joint for indicating a respective one of coupled and uncoupled states.

12. A pick-up baler for harvested crops, comprising:
a supply channel;
a baling channel including a baling channel inlet opening communicative with said supply channel;
a compression piston disposed in said baling channel, operation of said compression piston compressing said harvested crops conveyed into said baling channel through said baling channel inlet opening via said supply channel;
a rotary conveyor which rotates about an axis of rotation;
rakes, including at least one conveying rake and at least one supply rake, rotatably mounted to said rotary conveyer for rotation each about a corresponding rake axis, each said rake axis extending codirectionally with the axis of rotation of the rotary conveyer;
said at least one conveying rake being guided along a curved path as said rotary conveyer is rotated, at least a portion of said rake extending into said supply channel such that rotation of said at least one conveying rake about said fixed curve conveys said harvested crops into said supply channel; and
said at least one supply rake being guided in a movable curved path, movement of said curved path swiveling said at least one supply rake about said rake axis corresponding thereto causing said at least one conveying rake to be reoriented from a conveying position into a supplying position, the swiveling of said at least one supply rake being controllable as a function of a degree of filling of the supply channel in such a manner that, when a specified degree of filling of the supply channel is reached, the harvested crop, collected in said supply channel by operation of said at least one conveying rake, is conveyed via said baling channel inlet opening into said baling channel.

13. A pick-up baler according to claim 12, wherein said curved path along which said at least one conveying rake is guided is fixed.

* * * * *